(12) United States Patent
Sprague et al.

(10) Patent No.: US 8,064,073 B2
(45) Date of Patent: Nov. 22, 2011

(54) ADAPTIVE RASTERIZER BUFFER

(76) Inventors: Jeffrey R. Sprague, San Jose, CA (US); Paul M. Wegner, Fremont, CA (US)

( * ) Notice: Subject to any disclaimer, the term of this patent is extended or adjusted under 35 U.S.C. 154(b) by 2113 days.

(21) Appl. No.: 10/308,550

(22) Filed: Dec. 3, 2002

(65) Prior Publication Data

US 2004/0105124 A1 Jun. 3, 2004

(51) Int. Cl.
*G06F 3/12* (2006.01)
*G06F 13/00* (2006.01)

(52) U.S. Cl. ............... 358/1.13; 358/1.15; 358/1.16; 358/1.17; 710/22; 710/30; 710/56

(58) Field of Classification Search ............... 358/1.13, 358/1.15, 1.16, 444, 1.17; 710/56, 57, 22, 710/30; 725/89
See application file for complete search history.

(56) References Cited

U.S. PATENT DOCUMENTS

| | | | | |
|---|---|---|---|---|
| 5,108,207 A * | 4/1992 | Isobe et al. | ...................... | 400/70 |
| 5,692,112 A * | 11/1997 | Brady | ........................... | 358/1.16 |
| 5,764,811 A * | 6/1998 | Kakutani | ...................... | 382/252 |
| 6,052,202 A * | 4/2000 | Shimizu | ....................... | 358/1.16 |
| 6,151,134 A * | 11/2000 | Deppa et al. | ................. | 358/1.15 |
| 6,665,082 B1 * | 12/2003 | Takeoka et al. | ............. | 358/1.15 |
| 6,809,833 B1 * | 10/2004 | Blair et al. | .................... | 358/1.16 |
| 6,867,767 B2 * | 3/2005 | Meldrum et al. | ............. | 345/419 |
| 6,870,633 B1 * | 3/2005 | Kadota | ......................... | 358/1.13 |
| 7,088,466 B1 * | 8/2006 | Tomomatsu | ................. | 358/1.16 |
| 2002/0055984 A1 * | 5/2002 | Chang et al. | ................. | 709/217 |

* cited by examiner

Primary Examiner — David K Moore
Assistant Examiner — Peter K Huntsinger
(74) *Attorney, Agent, or Firm* — Merchant & Gould

(57) ABSTRACT

System and methods for printing are provided. One such method includes determining a storage capacity available for use as a rasterizer buffer, and implementing a rasterizer buffer having a storage capacity that is responsive to the storage capacity determined to be available for use as a rasterizer buffer.

29 Claims, 5 Drawing Sheets

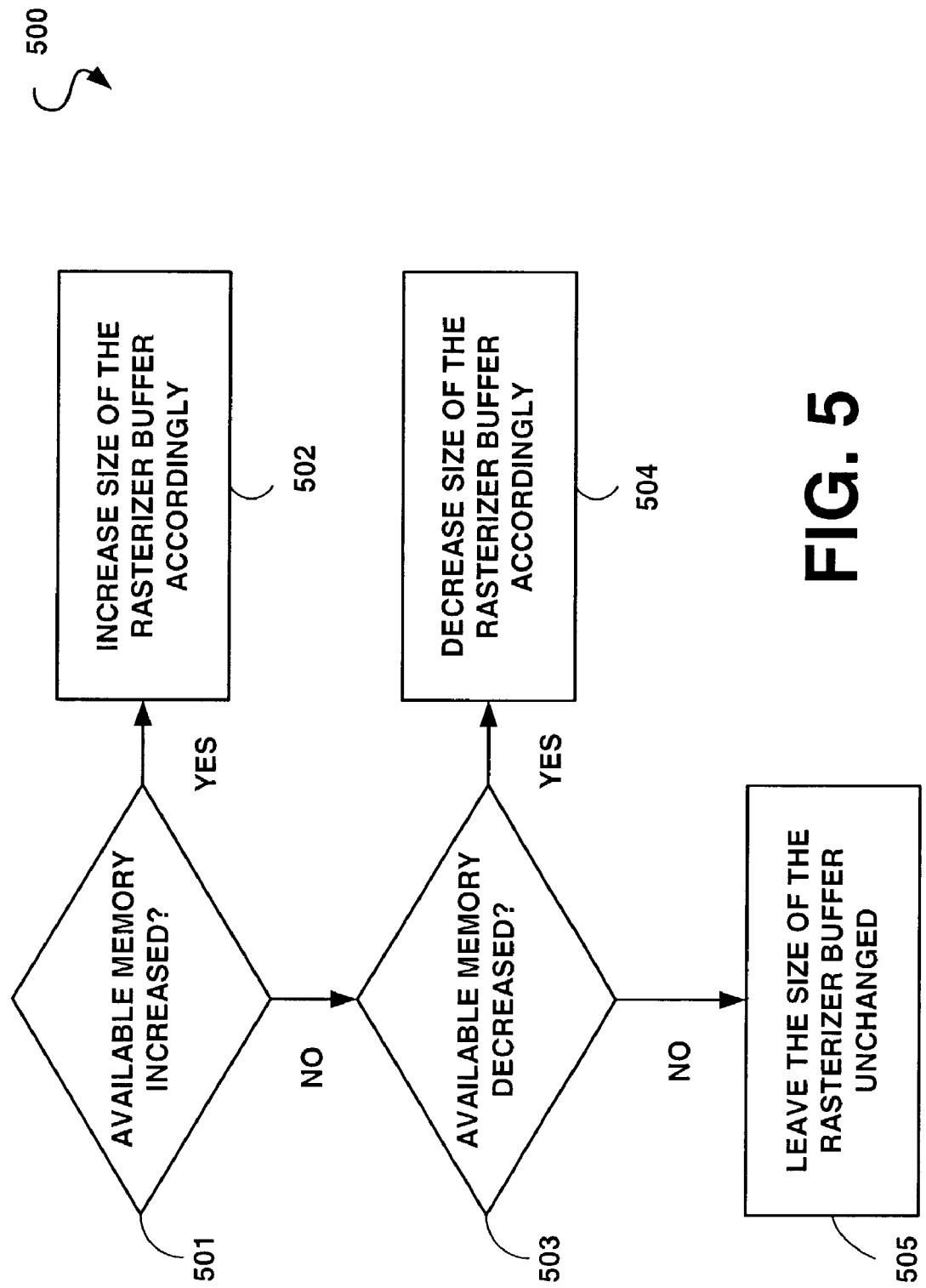

ADAPTIVE RASTERIZER BUFFER

TECHNICAL FIELD

The present invention is generally related to printing, and, more particularly, is related to systems and methods for implementing a rasterizer buffer.

DESCRIPTION OF THE RELATED ART

Preparing a print job to be transmitted to a printer using a system that includes limited memory capacity often involves using a rasterizer buffer that is capable of buffering only a small portion of a print-job page at any given time. Such portion of a print-job page, which encodes a predetermined number of bit-mapped pixel rows, is referred to as a "band." After each band is created by a rasterizer and then passed on to a spooler, the rasterizer creates another band that is also passed to the spooler, and so on until a print job is completed. Each rasterized band is stored in the rasterizer buffer in place of a preceding band, if any.

The time and amount of processing required to rasterize a print-job page in this manner is typically much greater than the time and amount of processing required to rasterize an entire print-job page in a single rasterization process (i.e., by buffering a bitmap representation of the entire print-job page in a rasterizer buffer). This is because drawing operations that intersect a plurality of bands are processed (e.g., rendered in memory) a plurality of times during the separate rasterization of the plurality of bands. Although rasterizing an entire print-job page in a single rasterization process may be faster and more efficient, it is not feasible in many limited memory systems because of the large amount of memory that may be necessary to store an entire bit-mapped rendition of the print-job page.

Therefore, there exists a need for systems and methods that address these and/or other perceived shortcomings of prior printing systems.

BRIEF DESCRIPTION OF THE DRAWINGS

The invention can be better understood with reference to the following drawings. The components in the drawings are not necessarily to scale, emphasis instead being placed upon clearly illustrating the principles of the invention. Moreover, in the drawings, like reference numerals designate corresponding parts throughout the several views.

FIG. 5 is a flow chart depicting a method for implementing a rasterizer buffer, according to another embodiment of the invention.

DETAILED DESCRIPTION OF THE PREFERRED EMBODIMENTS

Figure 1:
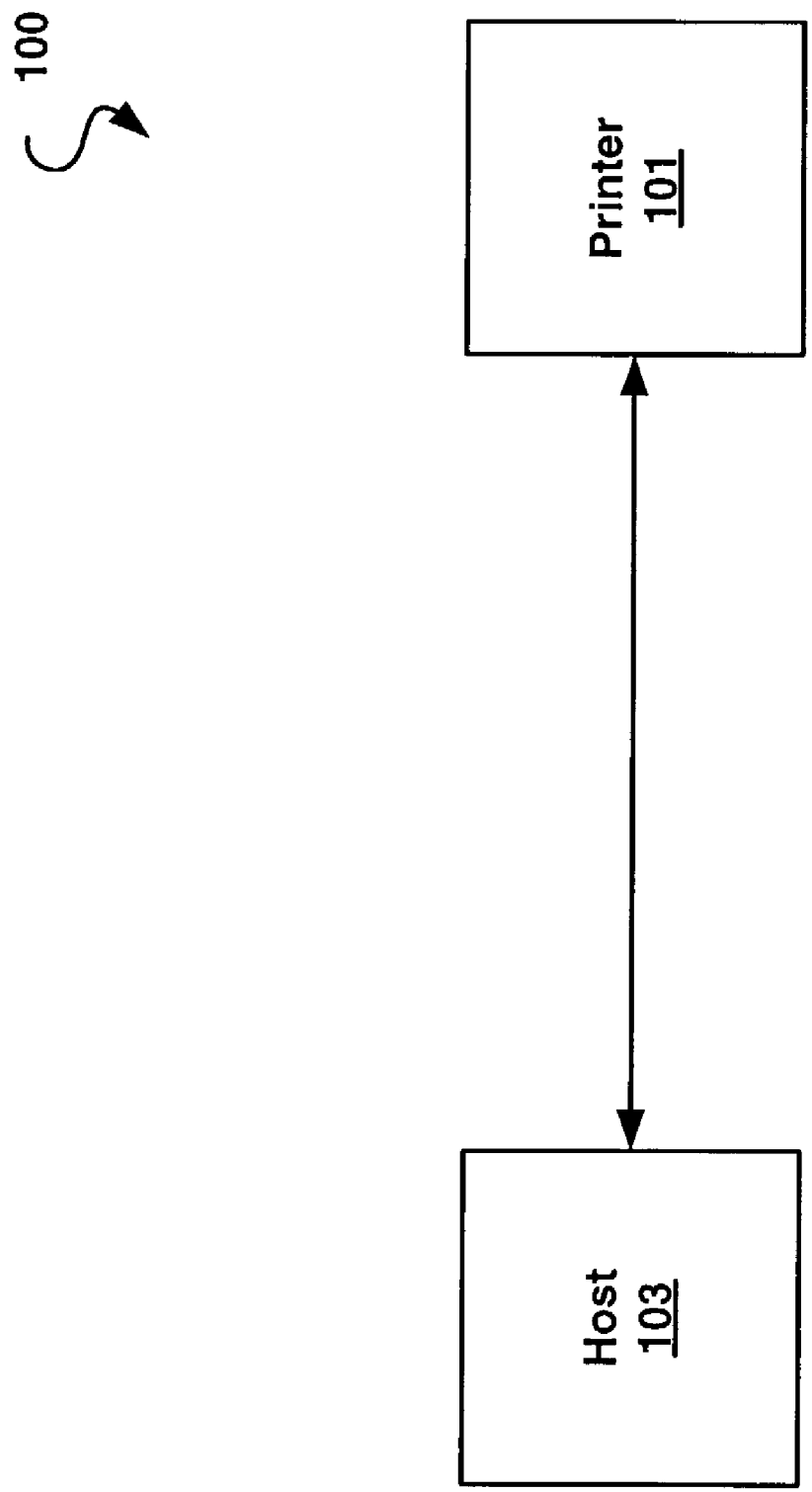
FIG. 1 depicts a non-limiting example of a printing system featuring a printer that is coupled to a host, according to one embodiment of the present invention.

FIG. 1 depicts a non-limiting example of a printing system 100 comprising a host 103 and a printer 101. The host 103 may be a special purpose computer (e.g., a television set-top terminal) or a general purpose computer, such as, for example, a personal computer (PC; IBM-compatible, Apple-compatible, or otherwise), a workstation, a minicomputer, or a mainframe computer. The printer 101 may be any device that is capable of printing content received from the host 103, including, for example, among others, a laser printer, an inkjet printer, an impact printer, a solid-ink printer, or a multi-function device that provides other functionality (e.g., scanning, faxing, and/or copying) in addition to printing. The host 103 may be coupled to the printer 101 via a wired or wireless connection. Furthermore, although the host 103 is shown to be directly coupled to the printer 101, the host 103 and the printer 101 may alternatively be coupled via a network (not shown), such as, for example, a local area network (LAN).

Figure 2:
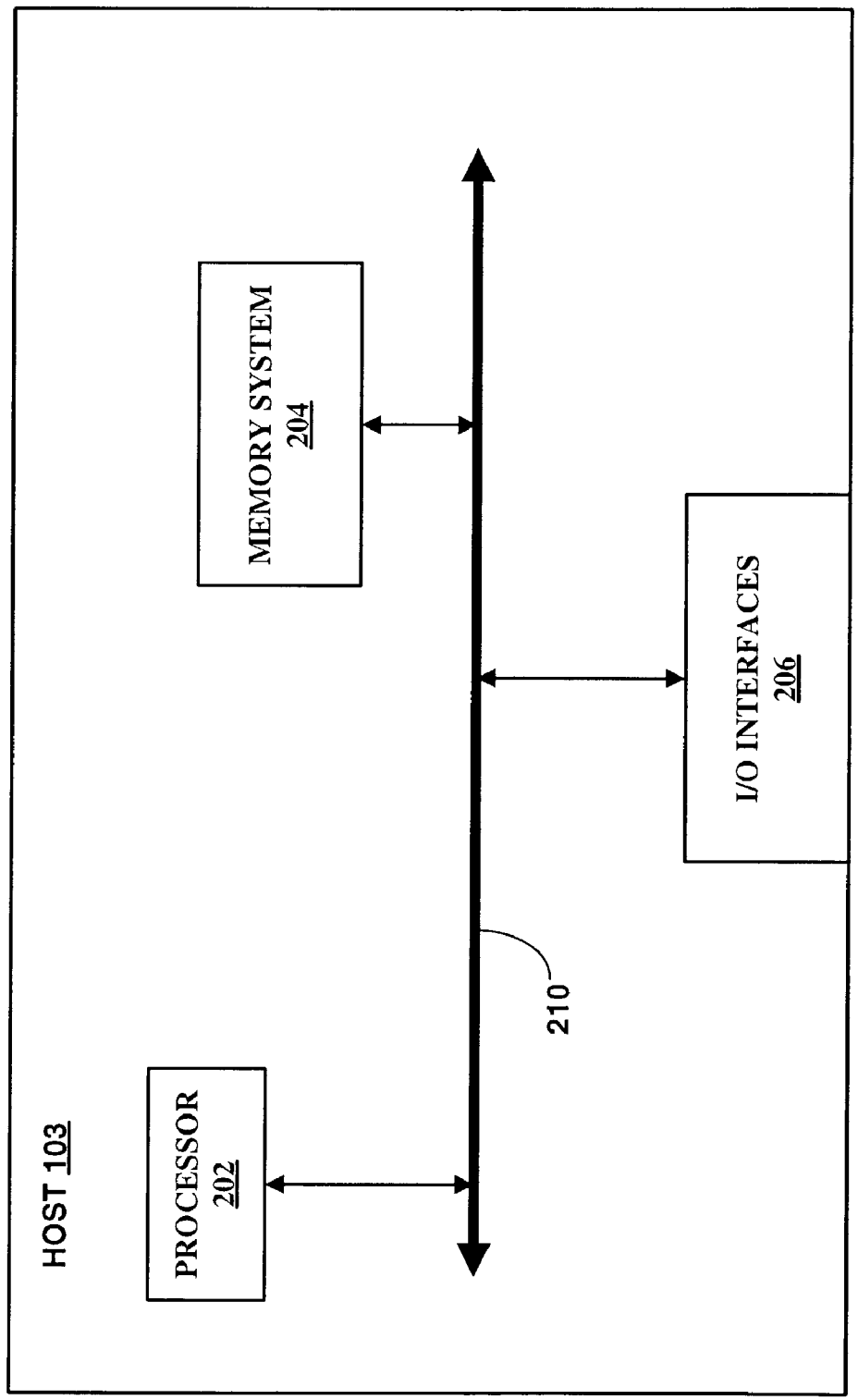
FIG. 2 is a block diagram depicting a non-limiting example of selected components of the host depicted in FIG. 1, according to one embodiment of the invention.

FIG. 2 is a block diagram depicting a non-limiting example of a host 103 that can be used to print via the printer 101. The host 103 is preferably an embedded system, such as, for example, a television set-top terminal that is coupled to a television set and to a headend (not shown). Such a set-top terminal may be a stand-alone unit or may be integrated into another device (e.g., a television), and may include the hardware and software necessary for providing television services and/or other functionality.

Generally, in terms of hardware architecture, as shown in FIG. 2, the components of the host 103 include a processor 202, memory 204, and input/output (I/O) interfaces 206. These components (202, 204, and 206) may be communicatively coupled via a local interface 210, or may be part of an application specific integrated circuit (ASIC). The local interface 210 can be, for example but not limited to, one or more buses or other wired or wireless connections. The local interface 210 may have additional elements, which are omitted for simplicity, such as controllers, buffers (caches), drivers, repeaters, and receivers, to enable communications.

The processor 202 is a hardware device for executing software, particularly that stored in memory 204. The processor 202 can be any custom made or commercially available processor, a central processing unit (CPU), an auxiliary processor among several processors associated with the host 103, a semiconductor based microprocessor (in the form of a microchip or chip set), or generally any device for executing software instructions. When the host 103 is in operation, the processor 202 is configured to execute software stored within the memory 204, to communicate data to and from the memory 204, and to generally control operations of the host 103 pursuant to the software.

The I/O interfaces 206 may be used to communicate with one or more peripheral devices including, for example, the printer 101 (FIG. 1). The I/O interfaces 206 may include, for example, a serial port, a parallel port, a Small Computer System Interface (SCSI), an IR interface, an RF interface, and/or a universal serial bus (USB) interface.

The memory 204 can include any one or combination of volatile memory elements (e.g., random access memory (RAM), dynamic RAM (DRAM), static RAM (SRAM), and/or synchronous DRAM (SDRAM), etc.) and nonvolatile memory elements (e.g., read only memory (ROM), hard drive, tape, compact disk ROM (CD-ROM), etc.). Moreover, the memory 204 may incorporate electronic, magnetic, optical, and/or other types of storage media. Note that the memory 204 can have a distributed architecture, where various components are situated remote from one another, but can be accessed by the processor 202.

Figure 3:
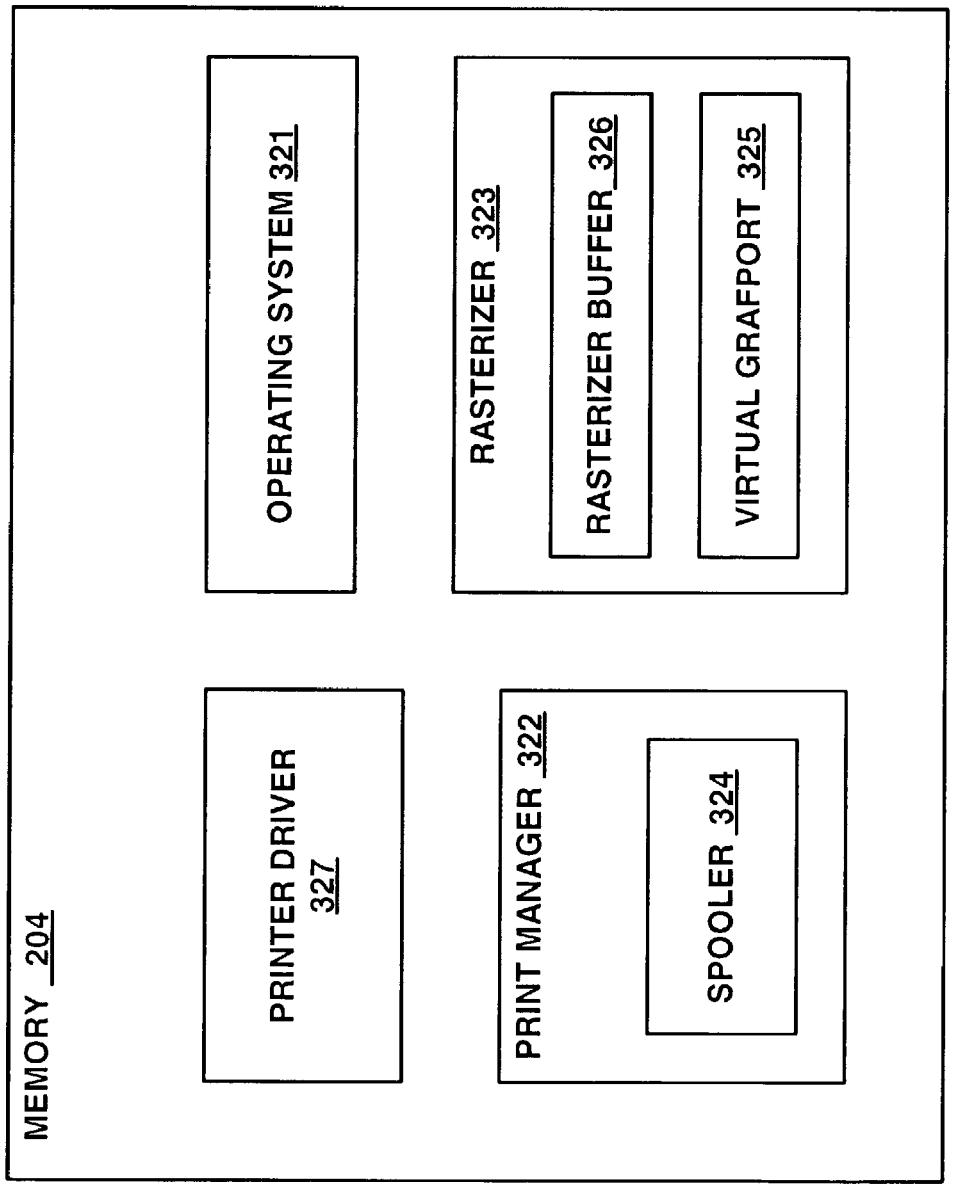
FIG. 3 is a block diagram depicting a non-limiting example of selected contents of the memory depicted in FIG. 2, according to one embodiment of the invention.

FIG. 3 is a block diagram depicting a non-limiting example of selected contents stored in memory 204 according to one embodiment of the invention. The software applications in memory 204 include an operating system (OS) 321, a print manager 322, a rasterizer 323, and a printer driver 327. The OS 321 essentially controls the execution of the other applications, and provides scheduling, input-output control, file and data management, memory management, and/or communication control, among other functionality.

The print manager 322 works with the rasterizer 323 and the printer driver 327 to enable the printing of a print job. The rasterizer 323 is a module that converts text and/or images (e.g., vector drawings) into bitmaps suitably formatted for printing. The rasterizer 323 may even scale existing bitmaps into different-sized bitmaps. For example, the rasterizer 323 may scale a bitmap having a first resolution (e.g., 640*480) into a bitmap having a second resolution (e.g., 2000*1500).

In a preferred embodiment, among others, the rasterizer 323 includes the sub-modules virtual-grafport 341 and rasterizer buffer 326. The rasterizer 323 converts drawing operations contained in the virtual-grafport 341 into bitmap data that are stored in the rasterizer buffer 326. This bitmap data is then converted into RGB data that are scaled to match the output resolution of the printer 101.

The virtual-grafport 341 captures drawing operations and stores them in such a way (e.g., descriptively) that enables the operations to be scaled and reproduced. A non-limiting example of a descriptive drawing operation that may be stored in a virtual-grafport 341 is as follows: "draw a circle at coordinates 150, 150 with a radius of 150." Storing drawing operations descriptively allows the rasterizer 323 to produce high quality output at the required printing resolution without requiring a bitmap image that occupies excessive memory resources.

The rasterizer 323 preferably creates bitmap representations of discrete portions of a print-job page. Each such portion (also referred to as a "band") includes a predetermined number of pixel rows, and is stored in the rasterizer buffer 326. After each band is passed to the spooler 324, the rasterizer 323 creates a bitmap representation of another band, which is also stored in the rasterizer buffer 326. Note that the rasterizer buffer 326 may be implemented using a certain portion of memory 204 when buffering a certain band, and may then be implemented using another portion of memory 204 when buffering another band.

The larger the bands (i.e., the greater the number of pixel rows in each band), the faster the rasterization process, but the greater the memory requirements for a print-job. Conversely, the smaller the bands (i.e., the lower the number of pixel rows in each band), the slower the rasterization process, but the smaller the memory requirements for a print-job.

For each band, the rasterizer 323 renders (in memory) every drawing operation that intersects (i.e., that occupies at least a portion of) that particular band. The drawing operations may be stored in the virtual-grafport 341 along with indications of vertical ranges (e.g., min/max y-coordinates) that the respective drawings operations span. In this manner, a drawing operation need not be rendered during the rasterization of a band that does not include any portion of an object described by such drawing operation.

If the rasterizer 323 does not initially render a band at full output resolution, then each pixel-line in the band may be subsequently stretched to correspond to the resolution of the printer 101 output. The rasterizer 323 may convert a row of data from a bitmap format to an RGB format by using a hardware blitter to copy, stretch, and/or reformat the row into a one-pixel-high working buffer that is at the full requested resolution and color depth of the printer 101 output. The process of copying, stretching and/or reformatting may alternatively be performed using software or a combination of software and hardware.

The rasterizer 323 may also perform vertical stretching to maintain the correct aspect ratio of an output image. This vertical stretching may be accomplished through simple line duplication. The rasterizer 323 may calculate the frequency of the line duplication operation based on the print height and source height. For example, if the print height of a print-page is equal to 2700 pixel rows, and the source height for the print-page is equal to 900 rows, then each line in a band may be duplicated three times (2700/900). Some lines may be duplicated more than others if the ratio of print height to source height is not an integer.

The spooler 324 acts as a FIFO (first-in, first-out) buffer between the rasterizer 323 and the printer driver 327. As the printer driver 327 consumes rasterized data, the spooler 324 buffers additional rasterized data by asking the rasterizer 323 to provide the spooler 324 with additional lines of graphics data. The spooler is preferably block-and-pointer based rather than stream based, and contains a list of pointers that point to respective lines of RGB data destined for the printer 101. For example, when a line of RGB data is requested from the spooler 324 by the printer driver 327, the spooler 324 returns a pointer that points to the next line of RGB data.

Each of the above-mentioned software applications may be a source program, an executable program (e.g., object code), a script, or any other entity comprising a set of instructions to be executed. When an application is a source program, then it may be translated via a compiler, assembler, interpreter, or the like, which may be included within the memory 204, so as to operate properly in connection with the OS 321. Furthermore, an application can be written as (a) an object oriented programming language, which has classes of data and methods, or (b) a procedure programming language, which has routines, subroutines, and/or functions.

Figure 4:
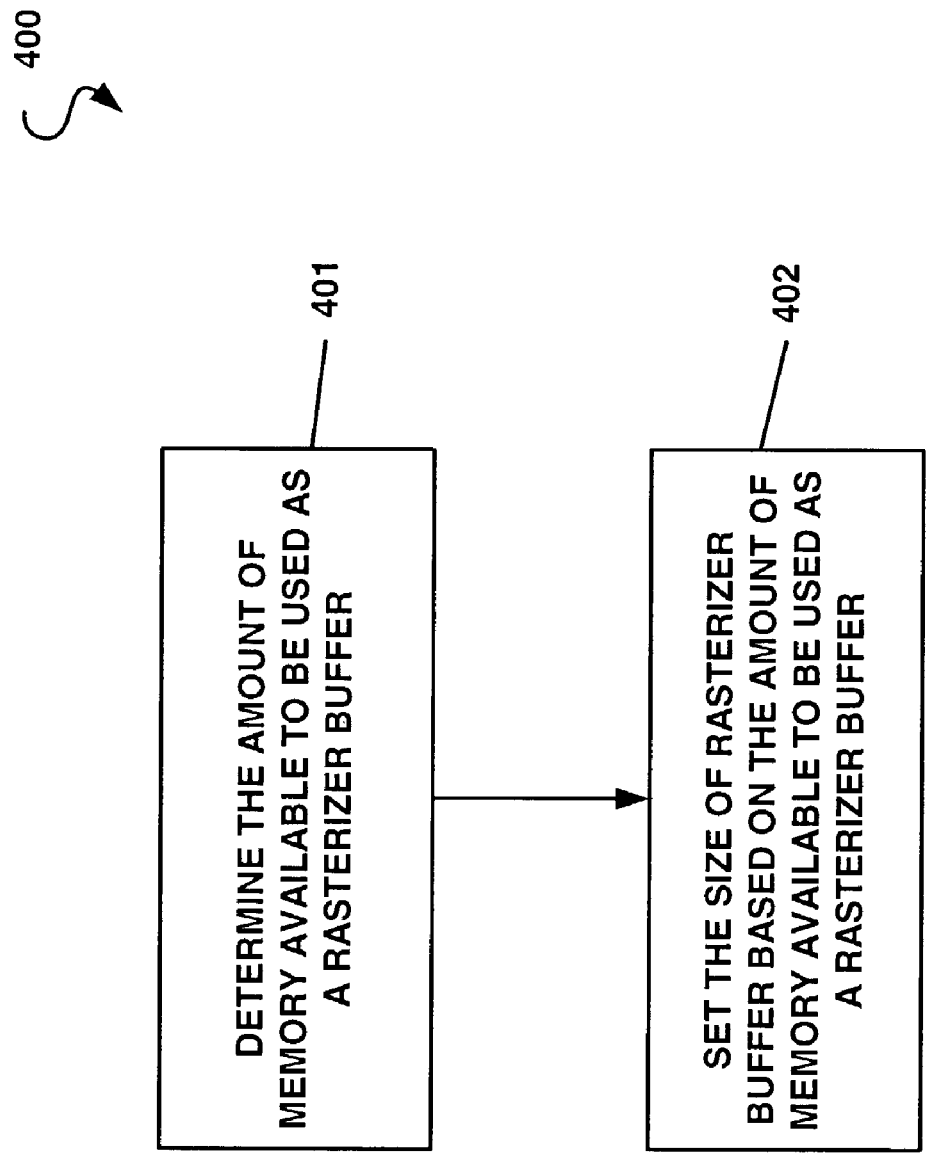
FIG. 4 is a flow chart depicting a method for implementing a rasterizer buffer, according to one embodiment of the invention.

FIG. 4 is a flow chart depicting a method 400 according to one embodiment of the invention. In step 401, the rasterizer 323 determines the amount of memory available to be used as a rasterizer buffer (e.g., based on data received from the OS 321). The determination of the amount of memory that is available to be used as a rasterizer buffer may be made based on, for example, the total amount of contiguous RAM that is currently available (i.e. not currently being used). Furthermore, an application that requests a print-job may be configured to specify a maximum amount of memory that can be used as a rasterizer buffer 326. Step 401 may be performed prior to the creation of each band by the rasterizer 323.

In step 402, the rasterizer 323 sets the size of rasterizer buffer 326 based on the amount of memory available to be used as a rasterizer buffer. As a non-limiting example, among others, if 100 kilobytes of RAM are available to be used as a rasterizer buffer, then the size of the rasterizer buffer 326 may be set to accommodate the maximum number of pixel lines that require an amount of storage capacity that is less than or equal to 100 kilobytes. In this manner, the greater the amount of memory available to be used as a rasterizer buffer, the greater the size of the rasterizer buffer 326, and the faster the rasterization process can become. Furthermore, when the amount of memory available to be used as a rasterizer buffer 326 drops below an amount of memory previously used as a rasterizer buffer 326, the host 103 can avoid having to abort or postpone the printing of a print job by reducing the size of the rasterizer buffer 326 to be less than or equal to the amount of available memory. Note that one or both steps shown in FIG. 4 may alternatively be implemented by another module such as, for example, the OS 321 or the print manager 322.

FIG. 5 is a flow chart depicting a method 500 according to one embodiment of the invention. In step 501, the rasterizer 323 determines if the amount of memory available to be used as a rasterizer buffer has increased (e.g., based on data received from the OS 321). If the amount of available memory has increased, then the rasterizer 323 increases the size of the rasterizer buffer 326 accordingly, as indicated in step 502. As a non-limiting example, among others, if the amount of memory available to be used as a rasterizer buffer 326 increases by 100 kilobytes, then the size of the rasterizer buffer 326 may be increased by up to 100 kilobytes to accommodate additional pixel lines. If, however, the amount of available memory has not increased, then the rasterizer 323 determines whether the amount of available memory has decreased, as indicated in step 503.

If the amount of available memory has decreased, then the rasterizer decreases the size of the rasterizer buffer accordingly. As a non-limiting example, among others, if the amount of memory available to be used as a rasterizer buffer 326 decreases by 100 kilobytes, then the size of the rasterizer buffer 326 may be decreased by at least 100 kilobytes in order to enable continued processing of a print-job. Note that if the amount of available memory decreases to a level that does not allow the buffering of data corresponding to at least one pixel row in the rasterizer buffer 326, then the print-job may be postponed or aborted.

If, however, the amount of available memory has not decreased, then the rasterizer 323 leaves the size of the rasterizer buffer 326 unchanged, as indicated in step 505. Note that one or more of the steps shown in FIG. 5 may alternatively be implemented by another module such as, for example, the OS 321 or the print manager 322.

The steps depicted in FIGS. 4 and 5 may be implemented using modules, segments, or portions of code which include one or more executable instructions. In an alternative implementation, functions or steps depicted in FIGS. 4 and 5 may be executed out of order from that shown or discussed, including substantially concurrently or in reverse order, depending on the functionality involved, as would be understood by those of ordinary skill in the art. Furthermore, the methods depicted in FIGS. 4 and 5 may be modified to include additional or fewer steps without departing from the scope of the present invention.

The functionality provided by the methods illustrated in FIGS. 4 and 5, can be embodied in any computer-readable medium for use by or in connection with a computer-related system (e.g., an embedded system) or method. In this context of this document, a computer-readable medium is an electronic, magnetic, optical, semiconductor, or other physical device or means that can contain or store a computer program or data for use by or in connection with a computer-related system or method. Furthermore, the functionality provided by the methods illustrated in FIGS. 4 and 5 can be implemented through hardware (e.g., an application specific integrated circuit (ASIC) and supporting circuitry), software, or a combination of software and hardware.

It should be emphasized that the above-described embodiments of the invention are merely possible examples, among others, of the implementations, setting forth a clear understanding of the principles of the invention. Many variations and modifications may be made to the above-described embodiments of the invention without departing from the scope of the invention. All such modifications and variations are intended to be protected by the following claims. In addition, the scope of the invention includes embodying the functionality of the preferred embodiments of the invention in logic embodied in hardware and/or software-configured mediums.

What is claimed is:

1. A method for printing, comprising the steps of:
communicating data between a processor, memory and an input/output interface of a host through a local interface;
determining, by a rasterizer, a storage capacity of the memory of the host that is available for use as a rasterizer buffer;
allocating, by the rasterizer, the rasterizer buffer from the memory, the rasterizer buffer having a storage capacity that is responsive to the storage capacity determined to be available for use as the rasterizer buffer;
buffering a next portion of bitmap data in the rasterizer buffer, the bitmap data associated with an image to be printed; and
providing the bitmap data from the rasterizer buffer in the memory of the host to a printer over the input/output interface,
wherein the determining and allocating steps are repeated by the rasterizer for each of a plurality of portions of bitmap data associated with the image to be printed.

2. The method of claim 1, further comprising:
providing the bitmap data to a spooler.

3. The method of claim 1, further comprising:
providing the bitmap data to a printer driver.

4. The method of claim 1, wherein the bitmap data encodes a plurality of pixel lines.

5. The method of claim 1, wherein the storage capacity of the rasterizer buffer is less than the storage capacity determined to be available for use as the rasterizer buffer.

6. The method of claim 1, wherein the storage capacity determined to be available for use by the rasterizer as the rasterizer buffer is inversely correlated to an amount of random access memory (RAM) that is currently being used.

7. The method of claim 1, wherein the bitmap data is generated based on at least one drawing operation that encodes content that is to be located at least in part within a portion of a printed page corresponding to the bitmap data.

8. The method of claim 1, wherein the rasterizer buffer is implemented in random access memory (RAM).

9. A method for printing, comprising the steps of:
communicating data between a processor, memory and an input/output interface of a host through a local interface;
determining, by a rasterizer, a storage capacity of the memory of the host that is available for use as a rasterizer buffer;
allocating, by the rasterizer, the rasterizer buffer from the memory;
rasterizing a next portion of content to be printed, the size of the next portion being responsive to the storage capacity determined to be available for use as the rasterizer buffer;
buffering the next portion of content to be printed in the rasterizer buffer, the portion of content to be printed associated with an image to be printed; and
providing the next portion of content from the rasterizer buffer in the memory of the host to a printer over the input/output interface,
wherein the determining and allocating steps are repeated by the rasterizer for each of a plurality of portions of content to be printed.

10. The method of claim 9, further comprising: providing the next portion to a spooler.

11. The method of claim 10, further comprising:
rasterizing a second portion of the content after the next portion of the content is provided to the spooler; and
buffering the second portion in the rasterizer buffer.

12. The method of claim 10, further comprising: providing the next portion to a printer driver.

13. The method of claim 9, wherein the next portion encodes a plurality of pixel lines.

14. The method of claim 9, wherein a storage capacity of the rasterizer buffer is less than the storage capacity determined to be available for use as the rasterizer buffer.

15. The method of claim 9, wherein the storage capacity determined to be available by the rasterizer for use as the rasterizer buffer is inversely correlated to an amount of random access memory (RAM) that is currently being used.

16. The method of claim 9, wherein the next portion is generated based on at least one drawing operation that encodes content that is to be located at least in part within the first portion.

17. The method of claim 9, wherein the rasterizer buffer is implemented in random access memory (RAM).

18. A host comprising:
a local interface for communicating data between components of the host;
a memory;
an input/output interface communicatively coupled with the memory through the local interface, the input/output interface for communicating data to a printer; and
a processor that is communicatively coupled to the memory and the input/output interface through the local interface and that is programmed to:
determine, by a rasterizer module, a storage capacity of the memory of the host that is available for use as a rasterizer buffer;
allocate, by the rasterizer module, the rasterizer buffer from the memory of the host, the rasterizer buffer having a storage capacity that is responsive to the storage capacity of the memory determined to be available for use as the rasterizer buffer; and
provide bitmap data from the rasterizer buffer in the memory of the host to the printer that is coupled to the host over the input/output interface,
wherein the processor is further programmed to determine the storage capacity and to allocate the rasterizer buffer having a storage capacity that is responsive to the storage capacity of the memory determined to be available for use by the rasterizer module as the rasterizer buffer for each of a plurality of portions of bitmap data.

19. The host of claim 18, wherein the processor is further programmed to:
buffer the bitmap data in the rasterizer buffer, wherein the bitmap data is configured to be printed on a page.

20. The host of claim 19, wherein the bitmap data encodes a plurality of pixel lines.

21. The host of claim 18, wherein the storage capacity of the rasterizer buffer is less than the storage capacity of the memory determined to be available for use as the rasterizer buffer.

22. The host of claim 18, wherein the bitmap data is generated based on at least one drawing operation that encodes content that is to be located at least in part within a portion of a printed page corresponding to the bitmap data.

23. The host of claim 18, wherein the memory comprises random access memory (RAM).

24. The method of claim 1, wherein the host is a television set-top terminal.

25. The method of claim 1, wherein the local interface is a bus.

26. The method of claim 9, wherein the host is a television set-top terminal.

27. The method of claim 9, wherein the local interface is a bus.

28. The host of claim 18, wherein the host is a television set-top terminal.

29. The host of claim 18, wherein the local interface is a bus.

* * * * *